July 3, 1934.   G. WAHNISH   1,965,442

LOCKING DEVICE FOR CAMERA SHUTTER OPERATING MEMBERS

Original Filed May 24, 1932

INVENTOR
GEORGE WAHNISH
BY
ATTORNEY

Patented July 3, 1934

1,965,442

UNITED STATES PATENT OFFICE 1,965,442

LOCKING DEVICE FOR CAMERA SHUTTER-OPERATING MEMBERS

George Wahnish, New York, N. Y., assignor of one-fourth to Charles M. Bleecker, Laurelton, N. Y.

Original application May 24, 1932, Serial No. 613,171. Divided and this application August 12, 1933, Serial No. 684,783

4 Claims. (Cl. 95—31)

The invention relates to photographic cameras, and more particularly to cameras of the type utilizing a film roll and embodying means for winding the film after each exposure upon a suitable take-up spool. In the operation of cameras thus utilizing a film roll, it frequently occurs that the operator neglects to advance the film after an exposure to provide an unexposed portion, with the result that a "double-exposure" is made upon the originally exposed film portion.

The present invention has for an object the provision of means in connection with the film-exposing mechanism whereby such double-exposure will be rendered impossible.

Another object of the invention resides in the provision of means of this nature suitable for use in connection with a fixed-focus camera.

Still another object of the invention resides in the provision of a shutter-locking device which will permit of only one operation of the shutter-operating member of the camera until a succeeding unexposed film portion has again been advanced into position.

A still further object of the invention is to admit of temporarily rendering the shutter-locking device inoperative, as when making time or bulb exposures.

In carrying out the invention, means are provided for effecting engagement with the usual shutter-operating member of the camera and for becoming so placed in relation to said member, during its operation to effect an exposure of a film portion, that the said shutter-operating member may not again be moved until the film-advancing mechanism has been actuated to advance a further film portion.

The nature of the invention, however, will best be understood when described in connection with the accompanying drawing, in which.

Figure 1:
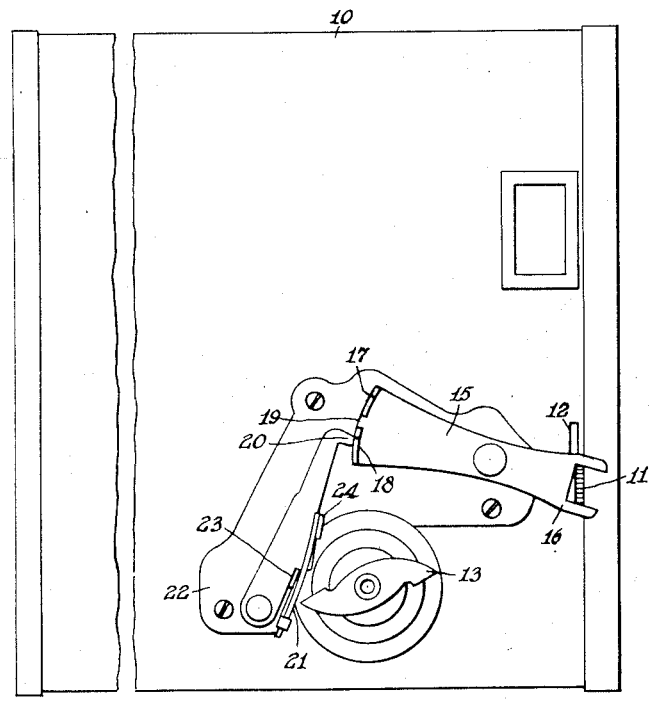
Fig. 1 is a side elevation of a fixed-focus camera of the box type and the camera being provided with the attachment for controlling the shutter-operating member, which attachment is shown as set for immediate operation of the shutter-operating member.
Figure 4:
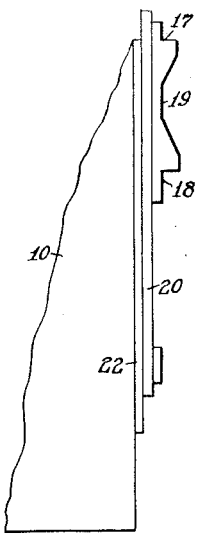
Fig. 4 is an end elevation, on an enlarged scale, of the attachment and film-wind member co-operating therewith.

Referring to the drawing, 10 designates a camera case or box containing the usual mechanism for supporting and advancing a film strip therethrough for exposure of successive portions, it being understood that the film strip is advanced a definite distance after each exposure to provide a new unexposed portion of the film. The shutter-operating member or finger piece 11 projects in the usual manner through the case, for example, from the side wall of said case and is movable upwardly and downwardly through a slot 12 therein.

In the usual operation of photographing with a camera of this nature, the finger piece or shutter-operating member 11 is caused to be moved first in one direction to effect exposure and then in the opposite direction for a succeeding exposure, but it frequently occurs that the photographer forgets or neglects to advance the film between exposures, this advance being effected in the usual manner from the film-wind element or key 13 conveniently positioned at one side and along the bottom of the camera case, as shown.

In accordance with the present invention, an attachment is provided whereby after one movement of the said finger piece 11 the same becomes automatically locked so that it may not be operated in the reverse direction until the film has again been advanced to bring into position for exposure the new unexposed portion thereof. As shown, the attachment is secured to the outer face of the side wall of the camera box 10, but it will be understood that the same may be installed within the said box as upon the inner face of said side wall.

This locking action is effected as a result of the movement of the finger piece 11, while the release of the locking mechanism is effected as a result of the actuation of the film wind 13. Thus, a lever 15 is provided at its one end with the forked portion 16 whose tines embrace the finger piece 11 for causing the lever to be moved simultaneously therewith in either direction of movement of the said finger piece.

At its opposite and inner end, the lever is provided with two upstanding cam surfaces and locking teeth 17 and 18 and with an intermediate notched or low portion 19.

A detent 20, moreover, is designed to lock behind one or the other of the teeth 17 or 18 to prevent corresponding movement of the opposite end of the lever 15 and consequently of the finger piece 11. The detent to this end is yieldingly urged toward (in a direction at right angles to) the teeth 17 and 18 and intermediate low portion 19, as by means of a spring 21 secured to the base plate 22 for the attachment and to which the detent is also pivoted for oscillation over the plate. The detent, moreover, is of spring steel or like resilient material to admit of a slight movement upwardly from the plate. An upturned lug 23 from this plate serves as a stop to limit the inward movement of the detent, while the free end of spring 21 is arranged to bear against an upstanding ear 24 along the inner edge of the said detent.

When the parts are set for operation of the finger piece to effect an exposure as in moving the same upwardly, for example as indicated in Fig. 1 of the drawing, the detent bears against the side of one of the teeth as the tooth 18. As the lever 15 is caused to follow the movement of the finger piece 11, detent 20 is forced into the low portion 19 between the teeth and then rides over the cam portion of the tooth 17 to drop eventually behind the said tooth under its own resiliency.

Figure 2:
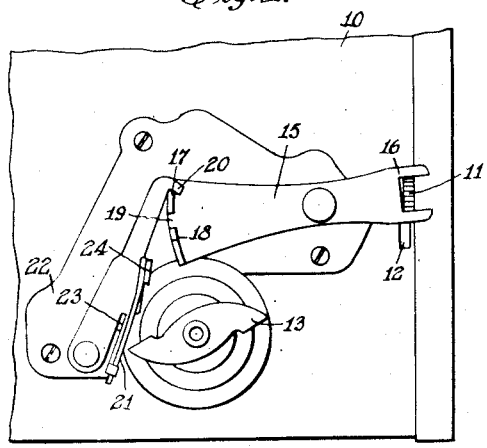
Fig. 2 is a fragmentary side elevation of the attachment showing the position of the mechanism after an exposure has been made by moving the shutter-operating member upwardly.
Figure 3:
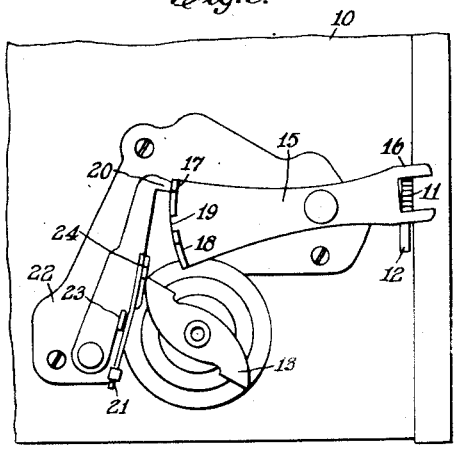
Fig. 3 is a similar view illustrating the manner of releasing the shutter-operating member so that it is free to be moved in a downward direction.

It is thus not possible to return the finger piece 11 (move the same in the opposite direction) for effecting a second exposure—the position of the members being then as indicated in Fig. 2 of the drawing. However, detent 20 may be caused to clear the tooth 17 by forcing it backwardly against the action of spring 21 which is accomplished through engagement of the film-wind 13 with the ear 24. The detent then moves toward the plate 22 and now bears against the side of tooth 17, as indicated in Fig. 3 of the drawing, leaving the lever 15 free to move for a subsequent exposure through the operation of finger piece 11.

The action of the detent during the downward movement of the finger piece is similar to that hereinbefore described, said detent first entering the low portion 19 and then riding up upon the cam of tooth 18 to drop eventually behind the same when the movement of finger piece 11 has been completed, and locking the parts against further operation of the said finger piece.

In the case of a time exposure where the finger piece must participate in both a forward and a reverse movement, the detent may be temporarily held out of action by resting on the film-wind 13.

By the hereinbefore described expedients, double-exposure of a film portion is rendered impossible, and, moreover, the locking mechanism may be utilized to insure against accidental operation of the shutter mechanism if the film be not brought into position until it is desired to actually make an exposure.

The present application is a division of my copending application Serial 613,171, filed May 24, 1932, upon which Patent No. 1,927,427, dated September 19, 1933, was granted.

I claim:

1. In combination with a rollfilm camera having an oscillatable shutter-operating member and the film-wind of the camera; of a lever having an arm adapted for engagement with the shutter-operating member in both directions of oscillation and its opposite arm provided with a pair of separated cam teeth, and a spring-urged detent adapted to ride over and to lock behind the said teeth to prevent further movement of said lever and said detent being positioned for engagement with the film-wind to locate the detent against the side of a tooth to restore freedom of movement of the lever.

2. The combination with a rollfilm camera shutter-operating member and the film-wind of the camera; of a lever having one arm forked to embrace the shutter-operating member and its opposite arm provided with a pair of separated cam teeth, and a spring-urged detent adapted to ride over and to lock behind the said teeth to prevent further movement of said lever and said detent being positioned for engagement with the film-wind to locate the detent against the side of a tooth to restore freedom of movement of the lever.

3. In combination with a rollfilm camera shutter-operating member and the film-wind of the camera; of a plate secured to the camera wall, a lever pivotally mounted thereon having one arm forked to embrace the shutter-operating member and its opposite arm provided with a pair of separated cam teeth, a detent pivoted to the plate adapted to ride over and to lock behind the said teeth to prevent further movement of said lever, and a spring secured at one end to the plate and having its opposite end engaging the detent to urge the same toward the said teeth and the said detent being positioned for engagement with the film-wind to locate the detent against the side of a tooth to restore freedom of movement of the lever.

4. In combination with a rollfilm camera shutter-operating member and the film-wind of the camera; of a plate secured to the camera wall, a lever pivotally mounted thereon having one arm forked to embrace the shutter-operating member and its opposite arm provided with a pair of separated cam teeth, a detent pivoted to the plate adapted to ride over and to lock behind the said teeth to prevent further movement of said lever, the detent being flexible and adapted to move upwardly from the plate, and a spring secured at one end to the plate and having its opposite end engaging the detent to urge the same toward the said teeth and the said detent being positioned for engagement with the film-wind to locate the detent against the side of a tooth to restore freedom of movement of the lever.

GEORGE WAHNISH.